United States Patent
Riondato

(10) Patent No.: US 7,475,940 B2
(45) Date of Patent: Jan. 13, 2009

(54) SUPPORT RAIL FOR A BICYCLE SADDLE SHELL

(75) Inventor: Francesco Riondato, Bassano Del Grappa (IT)

(73) Assignee: M. d'A. Francesco Riondato, Bassano Del Grappa (Vicenza) (IT)

( * ) Notice: Subject to any disclaimer, the term of this patent is extended or adjusted under 35 U.S.C. 154(b) by 59 days.

(21) Appl. No.: 11/659,152

(22) PCT Filed: Jul. 28, 2005

(86) PCT No.: PCT/EP2005/008211

§ 371 (c)(1),
(2), (4) Date: Feb. 1, 2007

(87) PCT Pub. No.: WO2006/013063

PCT Pub. Date: Feb. 9, 2006

(65) Prior Publication Data

US 2007/0246977 A1    Oct. 25, 2007

(30) Foreign Application Priority Data

Aug. 6, 2004    (IT)    ............ VI2004A0202

(51) Int. Cl.
    *B62J 1/00*    (2006.01)
(52) U.S. Cl. .................................................. 297/195.1
(58) Field of Classification Search ............. 297/195.1, 297/215.14, 463.1; 248/188.1, 219.4
    See application file for complete search history.

(56) References Cited

U.S. PATENT DOCUMENTS

| 544,625 | A | * | 8/1895 | Montague | ................ 297/195.1 |
| 6,402,234 | B1 | | 6/2002 | Yu | |
| 6,666,507 | B1 | * | 12/2003 | Ringgard | ................ 297/195.1 |
| 7,059,673 | B1 | * | 6/2006 | Lee | ......................... 297/195.1 |
| 2004/0026967 | A1 | | 2/2004 | Nelson | |
| 2006/0119147 | A1 | * | 6/2006 | Nelson | .................... 297/195.1 |
| 2006/0152047 | A1 | | 7/2006 | Riondato | |
| 2007/0194610 | A1 | * | 8/2007 | Lee | ......................... 297/195.1 |

FOREIGN PATENT DOCUMENTS

IT    VI2003A000020    2/2003

OTHER PUBLICATIONS

International Search Report.

* cited by examiner

*Primary Examiner*—Milton Nelson, Jr.
(74) *Attorney, Agent, or Firm*—Bucknam and Archer

(57) ABSTRACT

The invention relates to a support rail for a bicycle saddle shell of the type that presents two portions (1', 1") perfectly symmetrical in relation to the longitudinal plane of symmetry of the saddle. Thanks to its particular shape, both professional and touring cyclists are able to find the saddle always in the same position as previously set before use, even after several stresses due to intense and prolonged saddle use.

6 Claims, 7 Drawing Sheets

SUPPORT RAIL FOR A BICYCLE SADDLE SHELL

CROSS REFERENCE TO RELATED APPLICATIONS

Applicant claims priority under 35 U.S.C. §119 of Italian Application No. VI 2004A000202 filed Aug. 6, 2004. Applicant also claims priority under 35 U.S.C. §365 of PCT/EP2005/008211 filed Jul. 28, 2005. The international application under PCT article 21(2) was published in English.

The present finding relates to a support rail for the shell of the saddle for a bicycle.

It is known that bicycle saddles, and in particular, those used for road racing, for both professional athletes as well as amateur bikers, and also those used for mountain bike riding, have a rail as a support element for the shell of said saddles.

Said rails perform a dual function in guaranteeing the structural solidity of the shell, permitting the fixing of the saddle to the seat post positioned on the top of the tube that is located at the center part of the bicycle frame.

In fact, a wide variety of these rails are available on the market, but none of them can guarantee efficient and stable saddle fixation.

In fact, practically speaking, especially when saddles are used for professional racing, or under conditions where the thrust is sufficiently strong, and especially in the case of heavier athletes, it can occur that the saddle shell is detached partially from the fixations that connect it to the rail, and in this manner, it is slightly moved from the correct riding position in which it has been set with precision before the saddle has been used.

In practise, the user finds himself with a saddle that is not positioned in perfect symmetry with the longitudinal axis of the bicycle, and/or that however is not precisely positioned the way the user meant to adjust it at the beginning of the race.

The main object of the present finding is to realize a support rail of the aforesaid type while eliminating the problems described above, in that it must be able to guarantee a stable positioning of the saddle shell even after hard and intense use of the saddle in question. Furthermore, said rail must be particularly simple as far as its construction is concerned, and must not present, in particular, any complications either for its production or use.

This object is achieved by configuring the rail of the present invention according to the characteristics described in the following description of the preferred embodiment.

The present finding will now be illustrated in detail and described in reference to a particular embodiment, provided as an example, but not to be considered limiting in any manner, with the help of the enclosed drawings wherein:

FIG. 1 shows the rail according to the finding, in a manner that is per se known, under a saddle 2 for a bicycle, of the type normally used for road use, whether for racing or touring, as well as for mountain bikes.

The presence of this rail provides structural solidity for the saddle as well as permitting the fixation by means of a clamp 3, of a type per se known, to the seat post 4, which in turn is inserted into the centre tube generally present in the bicycle frame.

Figure 1:
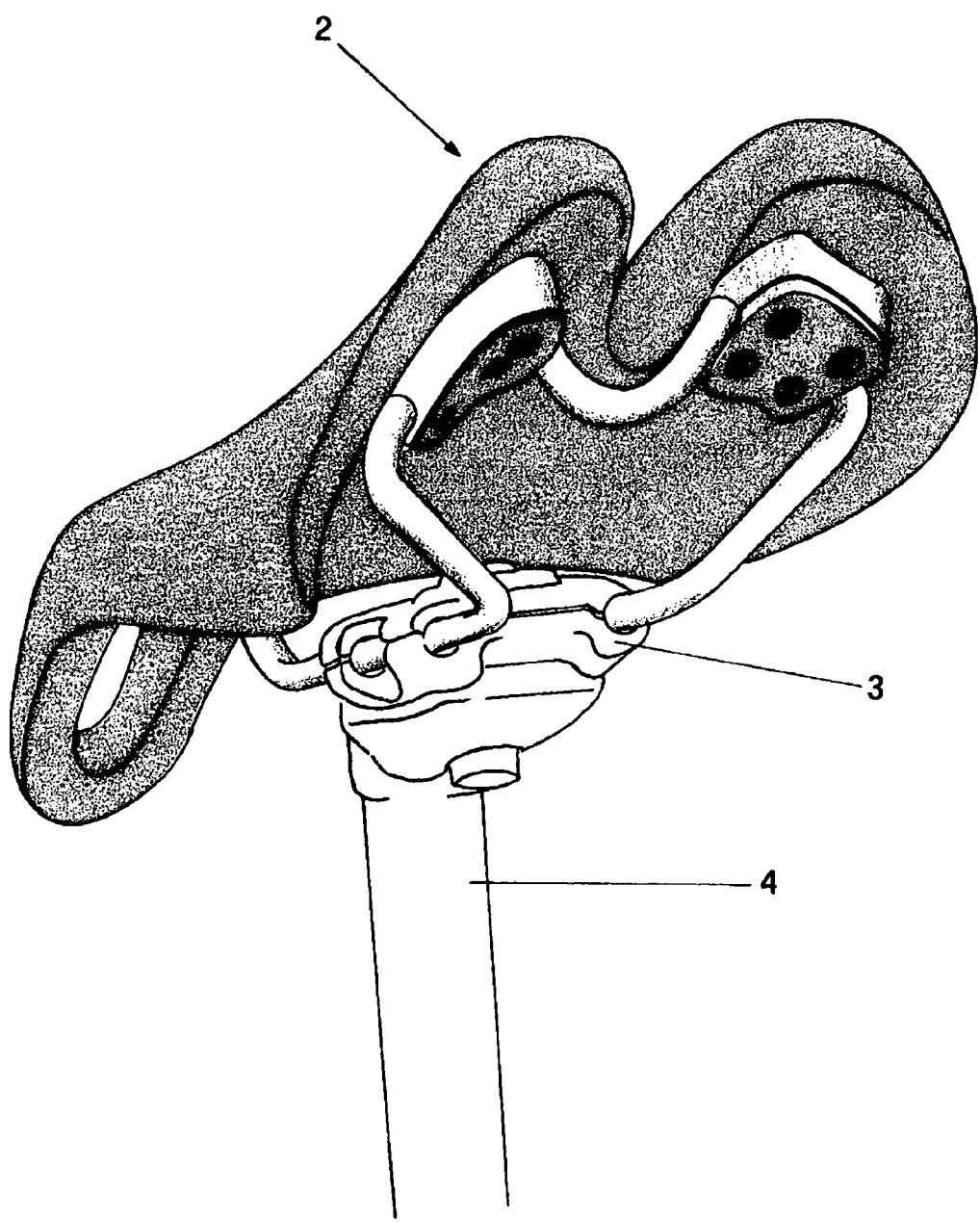
FIG. 1 shows a perspective view of the front part of a saddle including the rail according to the finding.
Figure 2:
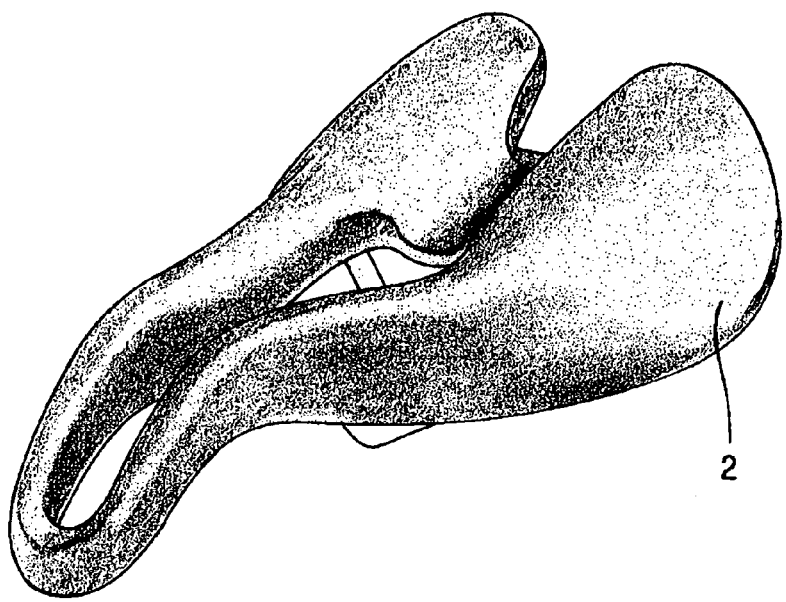
FIGS. 2 and 3 show respectively, a perspective and top plane view of a saddle using the rail according to the finding.
Figure 3:
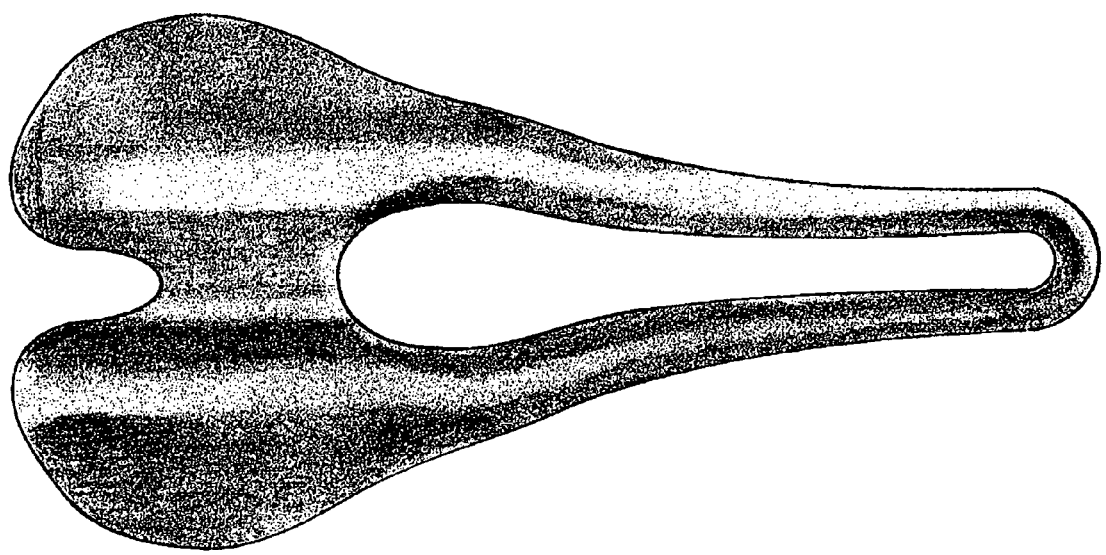

In particular, as shown in FIGS. 2 and 3, the rail according to the finding can be used in combination with a saddle shell of the type described in patent application n° VI2003A000020 by the same Applicant.

Figure 7:
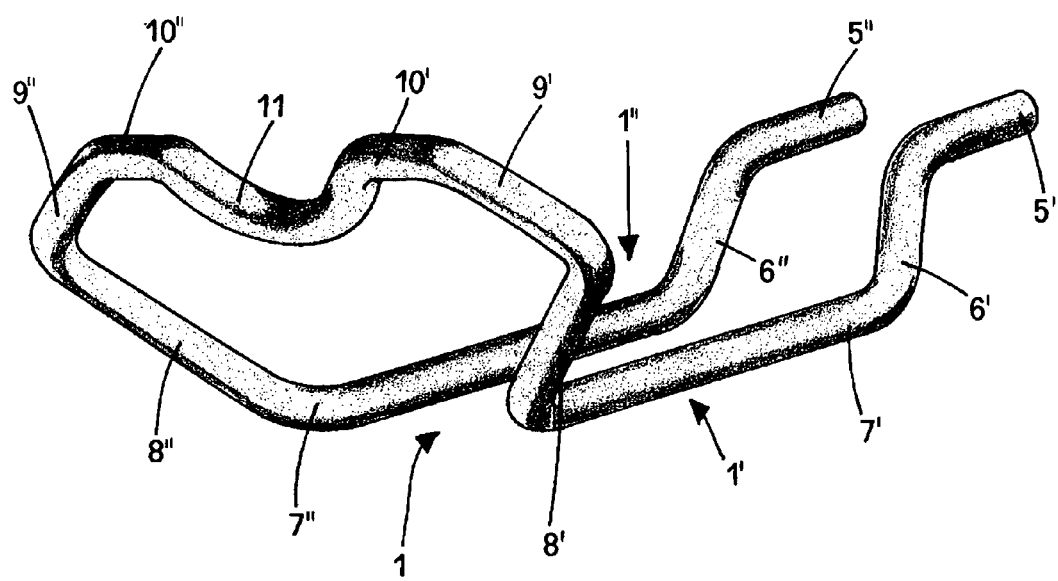
FIG. 7A shows an overall view of an alternative version of the rail according to the finding.

As can be seen in detail in FIG. 7, the rail 1 is realised in a single element in a material which must be at the same time, resistant and elastic, in particular in stainless steel, aluminium alloy, special alloy, etc.

Figure 7A:
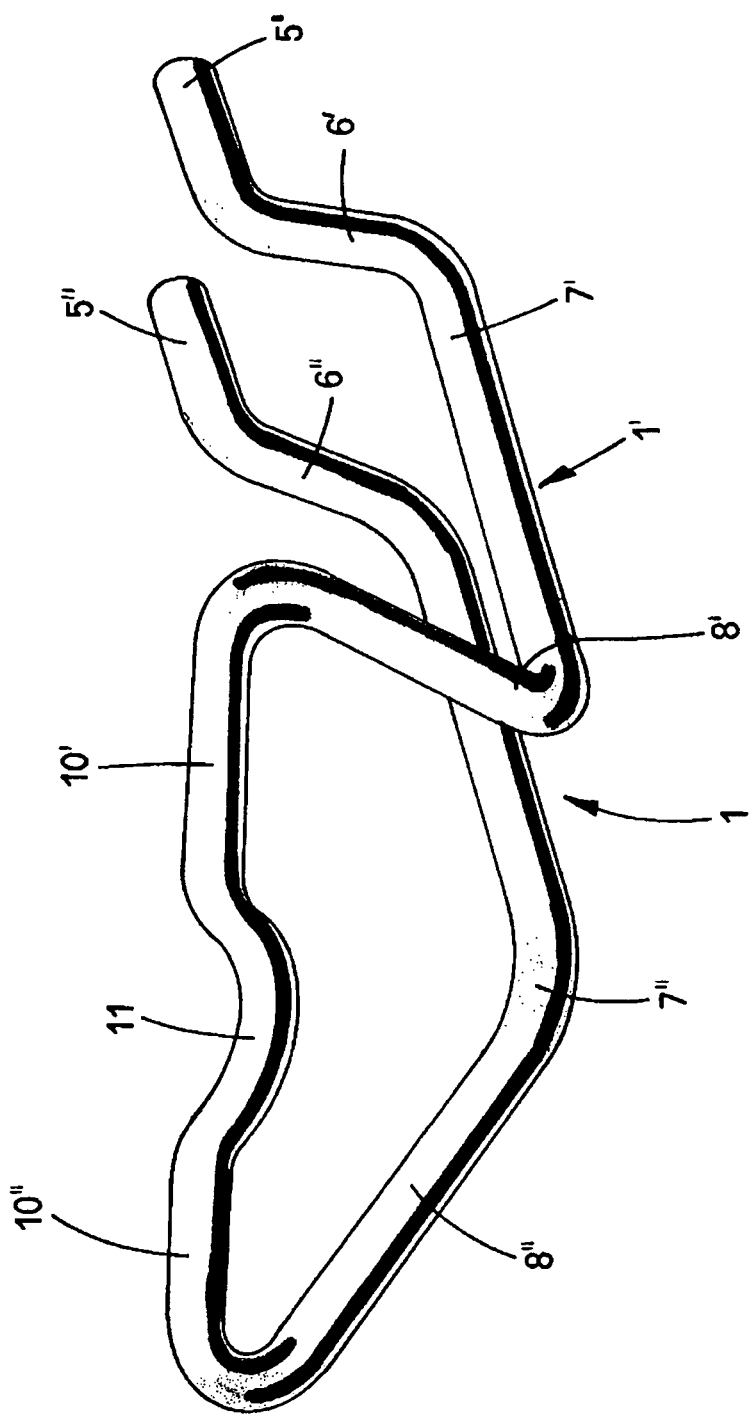

FIG. 7A shows a possible alternative configuration of the rail according to the finding, particularly suitable for touring bicycle saddles.

The configuration of said rail is such that it is composed of two portions (1' and 1" respectively) that are perfectly symmetrical in relation to the longitudinal and vertical plane of symmetry of the saddle.

As far as the specific configuration is concerned, both portions 1' and 1" of the rail present a first end section 5' and 5", arranged in a basically horizontal manner, in relation to its normal position after it has been mounted on the saddle, said sections then continue to form sections 6' and 6", which slope slightly, to continue forming sections 7' and 7", arranged in a basically horizontal manner, or slanted upwards for a maximum angle of 5°.

The total section formed by 5', 6', 7' (and naturally also 5", 6", 7") are configured to create a structure with a basically S-shaped contour with a considerably lengthened section.

At the end of these sections, the rail continues with two further straight sections 8', 8", which slope outwards and then reciprocally converge towards the centre line of the device.

The structure then continues to the uppermost part of the two previous sections with two further sections 9', 9", this time turning in an inward direction, thus forming with the two previous sections a basically L-shaped configuration. At the end of the two previous sections the structure continues with two short straight sections 10', 10" which are united reciprocally by a single semi-circular structure 11, whose lower vertex is positioned exactly on the longitudinal centre line of the device.

Figure 4:
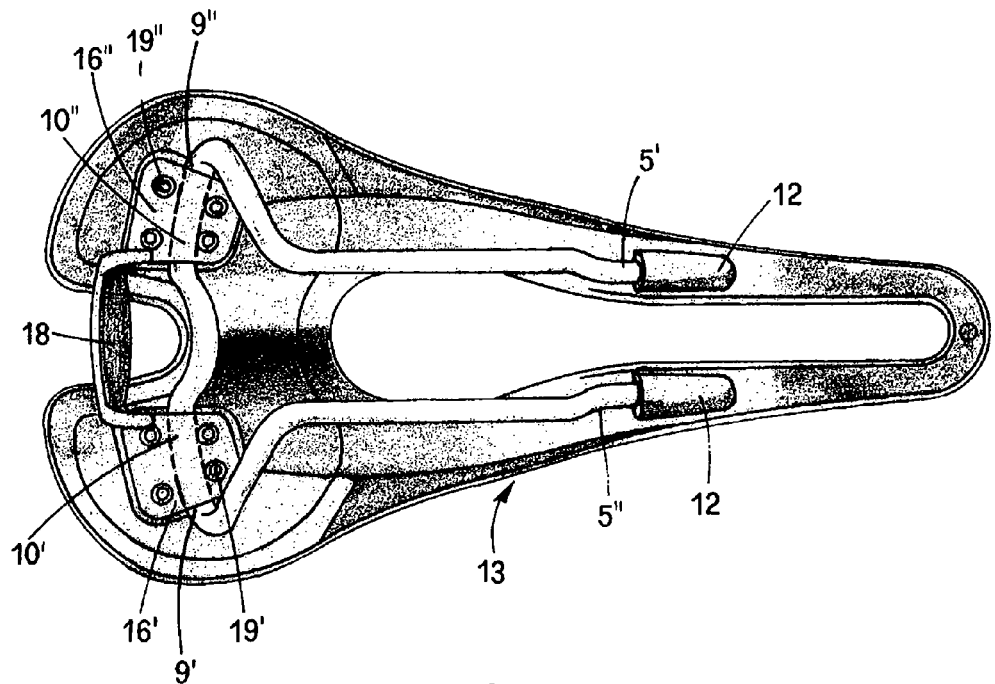
FIGS. 4 and 5 show bottom plane views of a saddle shell of the type adapted for use with the rail according to the finding, respectively with and without the aforesaid rail.

By attentively examining FIG. 4 closely, it can be seen that the end straight line sections 5' and 5" of the rail are inserted in a manner per se known, into two corresponding pockets 12 present in the lower surface of the shell 13 of the saddle.

Figure 5:
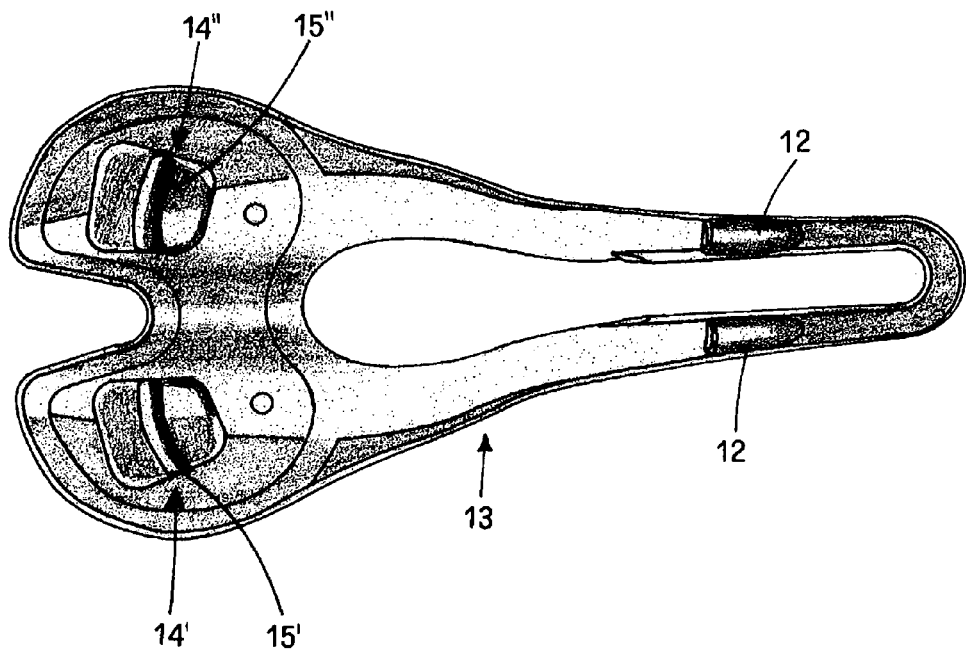

Vice versa, the rear part of the device is fixed to the shell in a particularly innovative manner, and will now be described in detail also with reference to FIG. 5.

In fact, when examined closely, these figures show that at the rear part of the lower surface of the shell 13 there are two prismatic structures 14', 14", with a basically trapezoidal perimeter. The sides of these trapezia are approximately 1.5 to 2 cm long.

Practically speaking, as shown in FIG. 4, the major part of section portions 9' and 10' (as well as 9" and 10") of the rail is set on said prismatic structures in channels 15', 15" present on their surface.

In order to maintain the corresponding sections of the rail solidly anchored in position, two cover plate elements 16', 16" (FIG. 8) are destined to be positioned over the sections of the rail enclosing them between the cover plates and the prismatic structures.

Each one of the said cover plates presents a plurality of holes 17', 17" (for example, four in number for each cover plate as shown in the figures) for the insertion of self-threading screws 19', 19", that can be screwed into the shell thus fixing the cover plates and the rail onto the shell underneath, in a stable manner.

Figure 6:
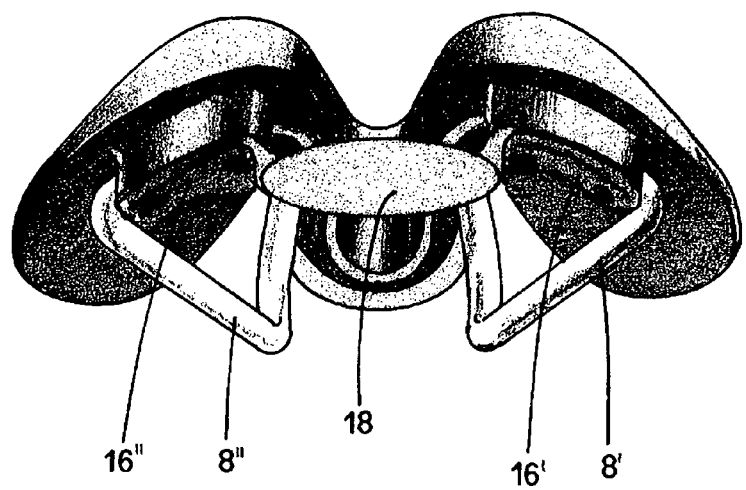
FIG. 6 shows a rear view of a saddle shell using the rail according to the finding.
Figure 8:
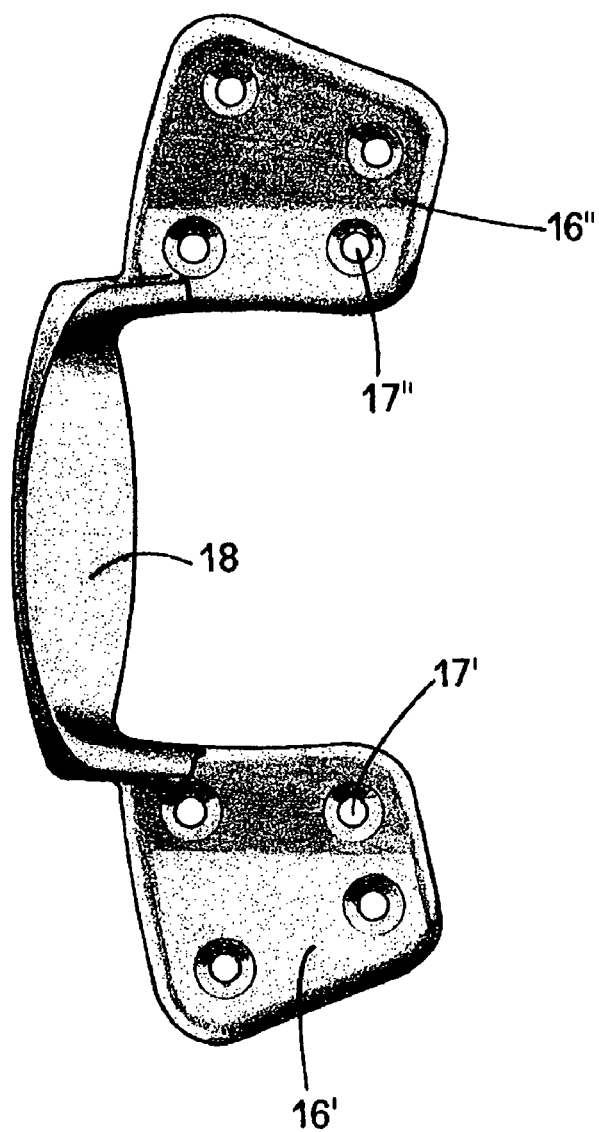
FIG. 8 shows a view of an accessory that permits the fixation of the rail according to the finding, to the relative saddle shell.

FIGS. 6 and 8 show the at the two cover plates 16', 16" can be reciprocally connected by a small bridge plate 18 which, after the cover plates have been mounted in their respective seats, can be attached to the rear of the shell in a manner similar to an identification or number plate. This small bridge plate could be printed with the saddle manufacturer's logo, or with other distinctive marking, patterns etc.

Advantageously, the transversal section of the rail will be in circular form with a diameter of approximately 7 mm.

The total length of the said rail will be approximately 16-20 cm.

Tests performed on the saddle have demonstrated that by adopting the aforesaid rail and its particular fixing devices to the shell, cyclists, whether for professional or touring use, always find the saddle in the same position previously set before use, even in the case of considerable stress caused by intense and prolonged use.

Figure 9:
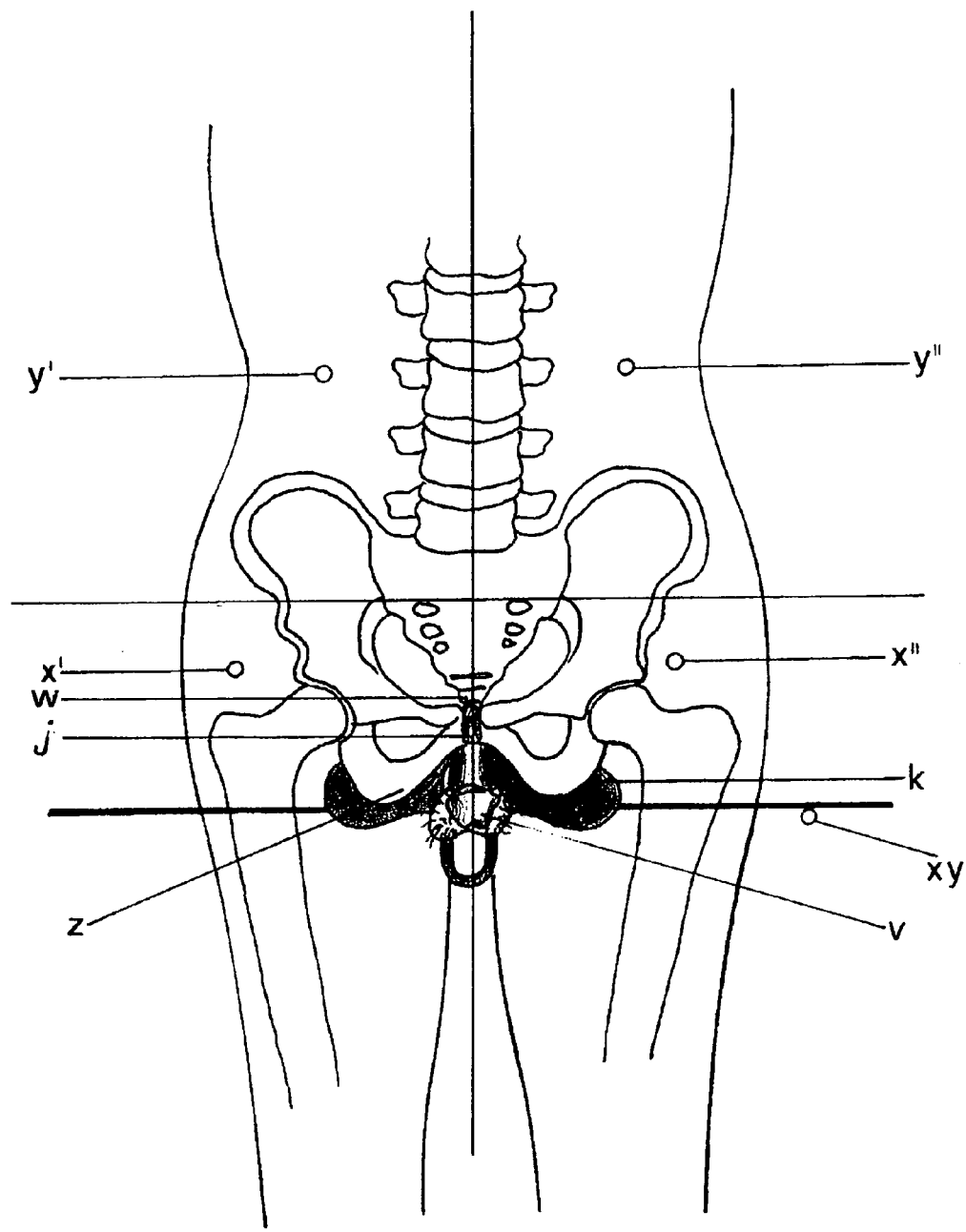
FIG. 9 shows a vertical section view of a male human body in a seated position on the saddle according to the finding, divided into four quadrants conventionally used to identify the human body.

Furthermore, by means of the use of the rails according to the finding, the four quadrants of the human body, right and left, upper and lower (FIG. 9) always remain stable and in correct axis with the saddle during any type of pedaling action, even intense or excessive, thus permitting all muscles and vital functions to interact in a uniform manner. In particular said FIG. 9 shows the K axis of the saddle, the imaginary x-y line parallel to the road plane, which corresponds with the stable support of the human body by the saddle; references v, z, j, and w indicate respectively the penis, testicles, pubic symphysis and coccyx. Lastly, y', y" and x', x" indicate the four quadrants that conventionally divide the human body.

The invention claimed is:

1. SUPPORT RAIL FOR A BICYCLE SADDLE SHELL of a bicycle saddle which presents two perfectly symmetrical portions (1', 1") in relation to the longitudinal plane of symmetry of the bicycle saddle, wherein both of said portions present a first end section (5', 5") arranged in a substantially horizontal manner in relation to its normal position after it has been mounted on the bicycle saddle shell, said end sections continuing to form first sections (6', 6"), which slope slightly, which continue forming second sections (7', 7"), arranged substantially horizontally, the total of the aforesaid sections being configured to create a substantially S-shaped structure with a considerably lengthened section, these sections continue with further straight third sections (8', 8"), which slope outwards and then reciprocally converge towards the center line of the support rail, the structure then continuing to the uppermost part of the two previous sections with two further sections (9', 9"), this time turning in an inward direction, thus forming with the two previous sections a substantially L-shaped structure, the ends of the two further sections (9', 9") of the structure being continued with two short straight sections (10', 10") which are united reciprocally by a single semi-circular structure (11), whose lower vertex is positioned exactly at the longitudinal center line of the support rail.

2. RAIL according to claim 1, wherein said support rail presents a transversal section in circular form having a diameter of approximately 7 mm.

3. RAIL according to claim 1, wherein its total length is approximately 16-20 cm.

4. BICYCLE SADDLE SHELL for combined use with the support rail according to claim 1, said shell being characterised in that at the rear part of the lower surface thereof are two prismatic structures (14', 14") having a substantially trapezoidal perimeter, each one presenting a channel (15', 15") on its surface, adapted for housing most of the portions of sections (9', 10', 9", 10") of the support rail, for each of the two prismatic structures (14', 14") a cover plate (16', 16") is provided destined to be positioned over the aforesaid sections of the support rail enclosing them between the cover plates and said prismatic structures, each of said cover plates having a plurality of holes (17', 17") in which self-threading screws, screwable into the shell, can be inserted, thus determining a stable fixation-of the cover plates and therefore the rail, to the shell underneath.

5. SADDLE SHELL according to claim 4, wherein the length of the sides of the prismatic structures (14', 14") is approximately 1.5-2 cm.

6. BICYCLE SADDLE SHELL, according to claim 4, wherein the two cover plates (16', 16") are reciprocally connected by a small bridge plate (18) which, after the cover plates have been mounted to their respective prismatic structures (14', 14"), is positioned on the rear of the shell in a manner of an identification or number plate.

\* \* \* \* \*